March 25, 1924.  
J. M. LOZIER  
1,488,360
DEMOUNTABLE RIM TO CARRY PNEUMATIC TIRES UPON VEHICLE WHEELS
Filed April 6, 1921  2 Sheets-Sheet 1
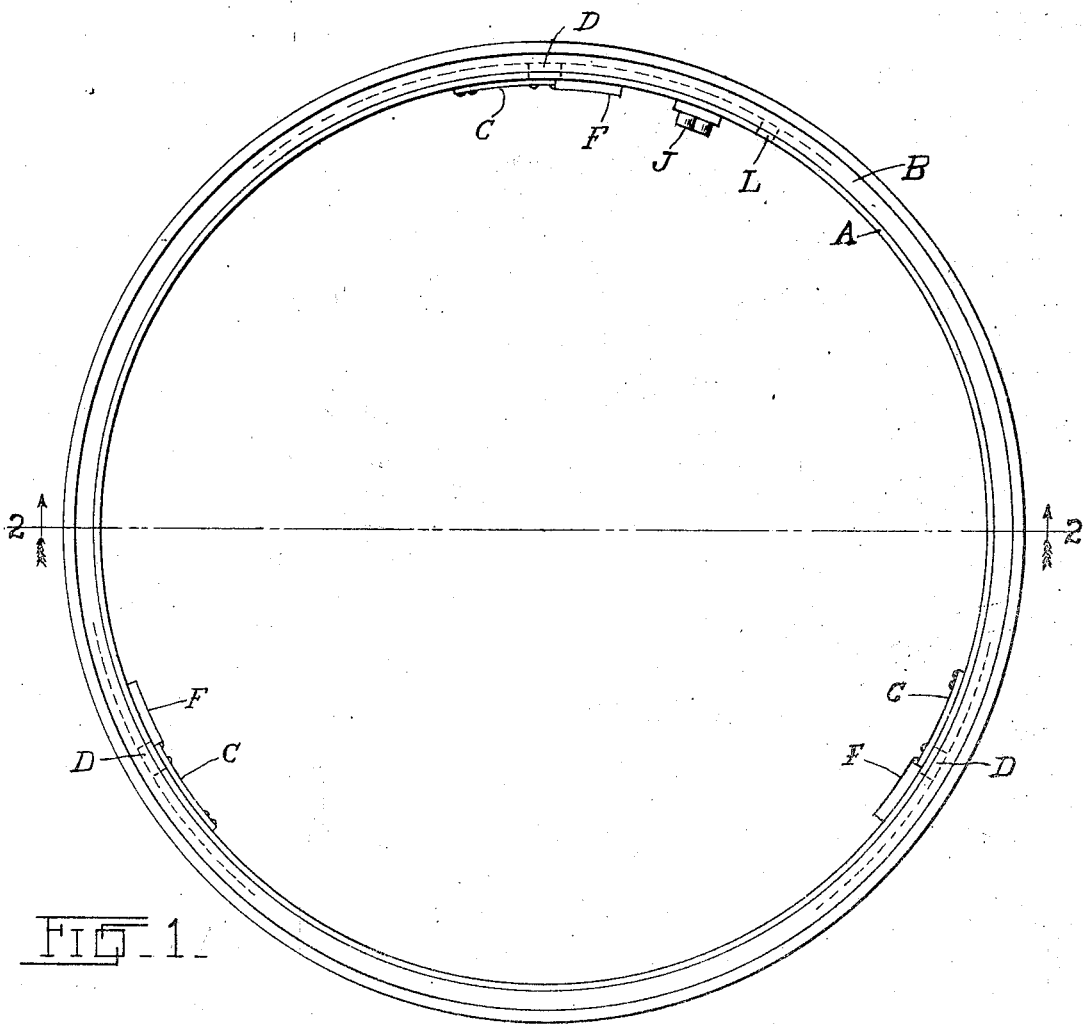
INVENTOR.  
Jesse M. Lozier.

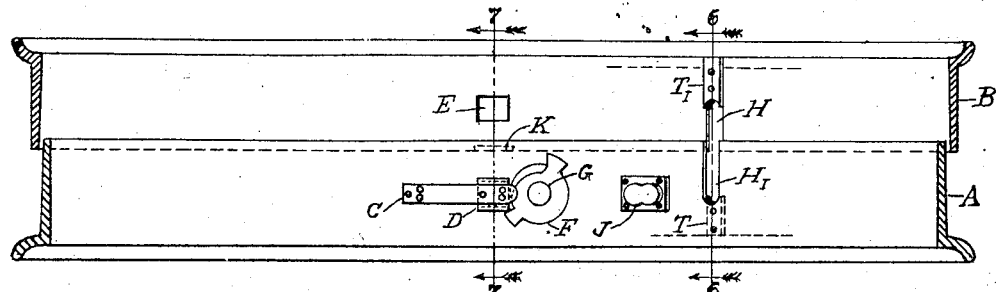
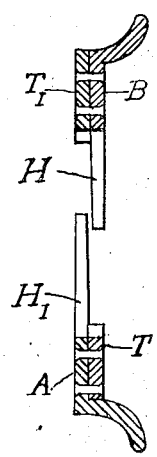
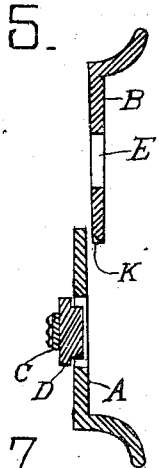
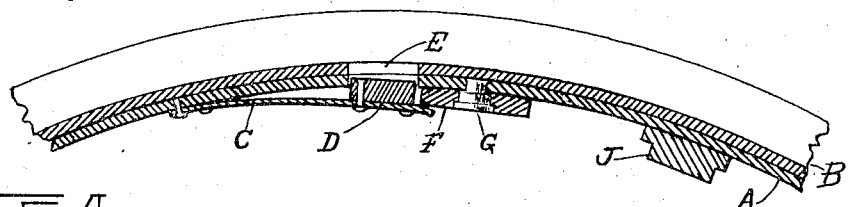
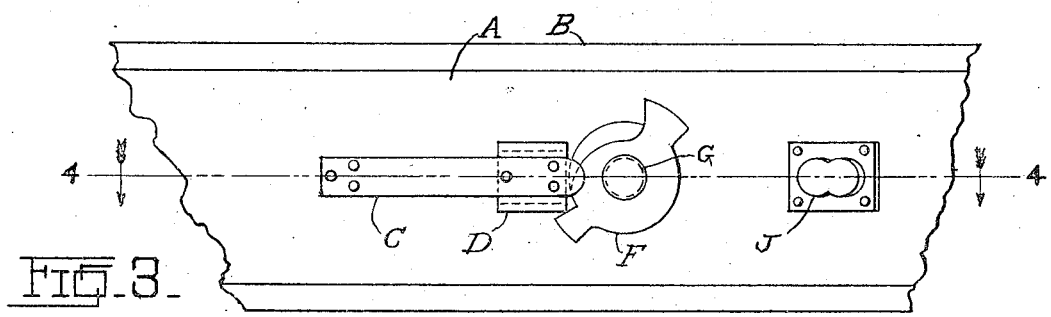
INVENTOR.
Jesse M. Lozier

Patented Mar. 25, 1924.

1,488,360

UNITED STATES PATENT OFFICE.

JESSE M. LOZIER, OF HUMBOLDT, ILLINOIS.

DEMOUNTABLE RIM TO CARRY PNEUMATIC TIRES UPON VEHICLE WHEELS.

Application filed April 6, 1921. Serial No. 459,025.

*To all whom it may concern:*

Be it known that I, JESSE M. LOZIER, a citizen of the United States, residing at Humboldt, in the county of Coles and State of Illinois, have invented a new and useful Demountable Rim to Carry Pneumatic Tires Upon Vehicle Wheels, of which the following is a specification.

My invention relates to improvements in demountable rims to which straight-side and clincher types of pneumatic tires are attached and consists of a rim made in halves, being divided annularly, the halves telescoping, and being held together by suitable locking devices which firmly hold the assembly positively together, and the objects of my improvements are to provide rims upon which the present types of straight-side and clincher pneumatic tires may be attached or detached with greater facility than is possible with the present types of demountable rims; also, to provide demountable rims on which clincher type pneumatic tires with non-elastic beads, of cord construction, and using a loose flap for inner tube protection, may be quickly attached. The working disadvantages of the present types of cross-split straight-side and solid clincher demountable rims are very numerous; a few are explained as follows:

1. With the present cross-split rims, the rims are distorted in each operation of attaching and detaching tires, thereby acquiring a permanent warp from the true original form, consequently they become more out of shape as the changes succeed each other.

2. Owing to the need of compressing and expanding cross-split rims in attaching tires, it is not always possible to install properly the inner tube protection strip or flap, nor to exclude all dirt or sand from the tube space of tire, both faults being destructive to the inner tube.

3. With the present solid clincher rims, it is almost impossible to use the inner tube protecting flap and as the tire must be pried and stretched over the rim edges, more or less dirt always is unavoidably installed within the tube space, and the tube is very often damaged by the pry irons used to accomplish the work.

Except to the experienced and frequently to the most experienced workman, a tire change with the present type rims mentioned, is a disagreeable job, very often resulting in injured hands, inner tubes and a considerable loss of time.

Therefore, with this new rim construction either of the tires afore-mentioned may be properly attached or detached most easily and repeatedly with a minimum risk of injury to either tire, tube, rim or operator, and without the necessity of special tools, excepting a hammer, only. The method of attaching a tire to this new rim is to lay the prepared tire assembly in proper position over the outer half rim, then to slide the inner half rim home, where it becomes locked automatically, the wedges being properly set in starting, to allow complete freedom of the spring locking mechanism, then to turn cam wedges to secure position and inflate the tire.

The detaching of a tire is the reverse operation to attaching, except locks must be unlocked first.

I attain these objects by the mechanism illustrated in the several views of the drawings, in which—

Figure 1, is a side elevation of the rim in straight side type; Fig. 2, a sectional plan view, taken on line 2—2 of Figure 1; Fig. 3, a plan view of inside of rim, showing one of the locking devices; Fig. 4, a sectional elevation taken on line 4—4 of Figure 3; Fig. 5, a sectional view of rim, showing the telescoping halves partly separated; Fig. 6, a cross section of rim, taken on line 6—6 of Figure 5, showing slots and guide strips; Fig. 7, a cross section of rim taken on line 7—7 of Figure 5, showing the locking block in inner half rim and locking-block slot and bevel edge in outer half rim.

Similar letters refer to similar parts throughout the several views.

The inner half rim A and the outer half rim B are so made as to telescope together, and suitable locking devices are provided as shown, several being used on each complete rim.

The locking device consists of a spring C, one end of which being riveted, or otherwise firmly attached to inner half rim A, carrying at its other end a block D, which fits into a slot E in outer half rim B, and the free end of spring C, which carries the block D, rests upon the cam F, which is pivoted to half rim A by rivet G. By a partial turn of cam F, the block D is lifted out of slot E in outer half rim B.

The telescoping halves of the rim are cone-shaped relative to their joining surfaces, and are made so to facilitate their separation, when a change of tire becomes necessary.

Each half rim is provided with a slot as shown at H and $H_1$ respectively, which, when the halves are assembled, leaves a circular opening L, for the projection of the valve stem.

When the half rims are being assembled, and the tire is in proper position, the strips T and $T_1$ slide into slots H and $H_1$ respectively, serving as guides to insure proper position of rim halves with respect to each other in relation to locking blocks D and openings E.

The driving lug J is shown attached to inner half rim A, and engages with felloe of wheel, to prevent creeping of demountable rim when wheel is turning.

The edge of the inner half rim is beveled opposite each locking slot as shown at K, which is to insure it from jamming against the locking blocks, when being pushed into position.

I am aware that prior to my invention demountable metal rims with joints, rings and locking devices have been made and used for carrying pneumatic tires.

I therefore do not claim such a combination broadly; but

I claim:

1. The combination, in a sectional telescoping demountable rim, of inner and outer major parts having registering openings, each major part extending entirely across the base of the supported tire, said parts being fitted together flaringly, and being so constructed as to be united and separated by straight telescoping motion to and from each other, means for securing said parts, comprising a flat spring attached longitudinally to the protected surface of the inner major part and carrying a locking element which is practically a movable section of the major parts, and is adapted to fill a pair of the registering openings, and a circular wedgefaced cam center-pivoted to inner major part, the cam being arranged to operate the locking element.

2. A sectional telescoping demountable rim comprising two major parts having registering openings, each major part extending entirely across the base of the supported tire, said parts being fitted together flaringly, and being so constructed as to be united and separated by straight telescoping motion to and from each other, means for securing said parts together, comprising a flat spring attached longitudinally to the protected surface of the inner major part and carrying a locking element which is practically a movable section of the major parts, and is adapted to fill a pair of registering openings, and a circular wedge-faced cam center-pivoted to the inner major part, the cam being arranged to operate the locking element, there being guide slots and guide strips on each major part adjacent to each other, and forming, when assembled, a circular opening for the reception of a valve stem.

3. A sectional telescoping demountable rim comprising two major parts having registering openings, each major part extending entirely across the base of the supported tire, said parts being fitted together flaringly and being so constructed as to be united and separated by straight telescoping motion to and from each other, means for securing said parts together, comprising a flat spring attached longitudinally to the protected surface of the inner major part and carrying a locking element which is practically a movable section of the major parts, and is adapted to fill a pair of the registering openings, a circular wedge-faced cam center-pivoted to the inner major part, and arranged to operate the locking element to the necessary position, there being guide slots and guide strips on each major part adjacent to each other, and forming, when assembled, a circular opening for the reception of a valve stem, and a driving lug including an offset base which is fitted to the inner major part.

JESSE M. LOZIER.